J. T. ALLMAND.
AUTOMOBILE DOOR LOCK.
APPLICATION FILED DEC. 13, 1917.

1,278,553.

Patented Sept. 10, 1918.
2 SHEETS—SHEET 1.

Inventor
JOHN T. ALLMAND.

By Stuart C. Barnes

Attorney

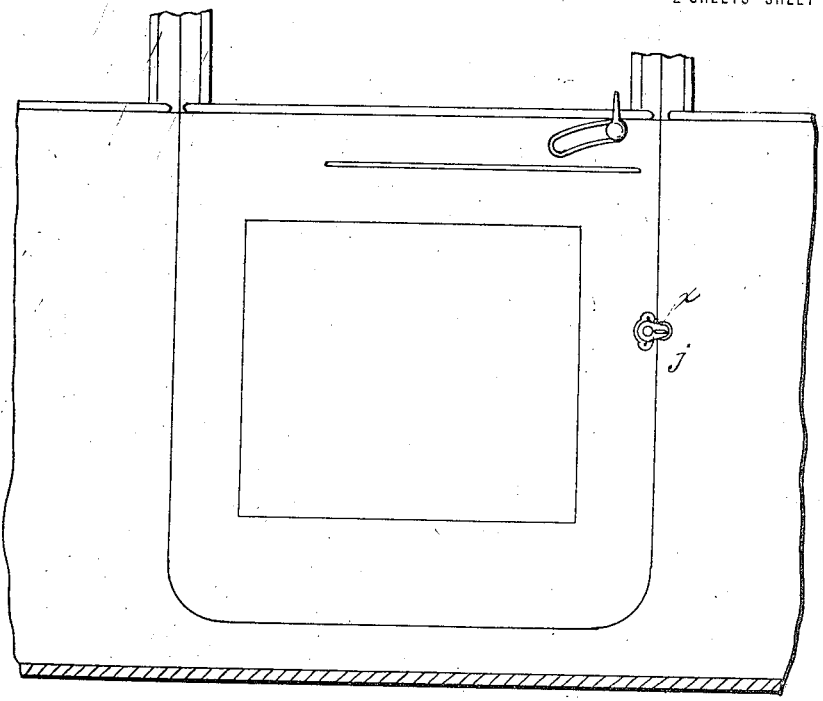
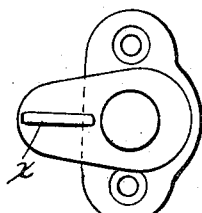
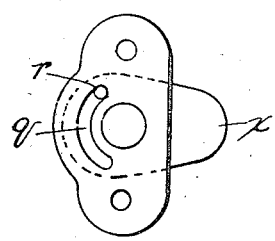
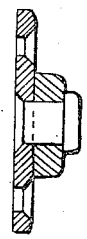
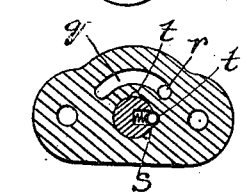
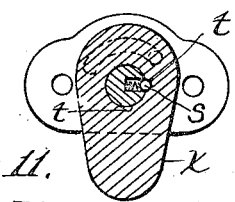
John T. Allmand.

UNITED STATES PATENT OFFICE.

JOHN T. ALLMAND, OF DETROIT, MICHIGAN, ASSIGNOR TO TERNSTEDT MANUFACTURING CO., OF DETROIT, MICHIGAN, A CORPORATION OF MICHIGAN.

AUTOMOBILE-DOOR LOCK.

1,278,553.  Specification of Letters Patent.  Patented Sept. 10, 1918.

Application filed December 13, 1917. Serial No. 206,901.

*To all whom it may concern:*

Be it known that I, JOHN T. ALLMAND, a citizen of the United States, residing at Detroit, in the county of Wayne and State of Michigan, have invented a new and useful Improvement in Automobile-Door Locks, of which the following is a specification.

This invention relates to hardware for automobile bodies and has for its object the combining of a cheap and desirable fastening device with a pin tumbler lock or cylinder lock.

It has not been the practice to equip the cheaper class of closed automobile bodies with door locks for the reason that efficient locks heretofore available for this purpose have been thought to be too expensive and therefore unwarranted. The hardware that I have designed can be made for application to an automobile body when built or it may be very easily applied by one after the car has been in use.

In the drawings,—

Fig. 6 is an inside elevation of a closed car showing the lock applied.

Fig. 7 is an elevation of a companion fastening device to that used on the cylinder or pin tumbler lock and which is used on the inside of the opposite door.

Fig. 8 is a rear elevation of either of the modifications of fastening devices.

Fig. 9 is a section of the fastening device shown in Fig. 7.

Fig. 10 is a section on the line 10—10 of Fig. 2, and which shows the spring detent which tends to keep the fastening device either open or closed.

Fig. 11 is a section through the modified form of fastening device.

The usual cylinder or pin tumbler lock, which has the spring tumblers $a$ and the serrated-edged key $b$, is employed. It is one of the features of this type of lock that the key must make a complete revolution before it can be withdrawn because obviously the tumblers cannot withdraw to allow the serrated key to be taken out until they register with the tumbler recesses of the casing, which only occurs at one point in the 360 degrees The lock itself may be bought on the market in the form shown. It is provided with the usual escutcheon $c$ for automobile bodies and the usual cover plate $d$. The back of the escutcheon is cut out to receive the flat spring $e$ which bears against the hinged end of the cover $d$ so as to form a jack-knife spring joint to hold the cover plate either open or closed. By recessing the back of the escutcheon to take this spring it is not necessary to cut a recess in the body of the car which would be rather inconvenient where it is expected to apply the lock to a body already completed and which has a metal panel.

Instead of using a sliding bolt, which is the mechanism usually used with a cylinder or pin tumbler lock and which requires mortising both the door posts and the door frame, a fastening device very simple in construction and application is utilized. This fastening device comprises simply an escutcheon $f$ and a wing $g$ having an integral pintle $h$ pinned into the sleeve $i$ so the sleeve and pintle rotate together in the escutcheon $f$ as a bearing. Fig. 6 shows how the wing can be rotated from a position parallel the door edge to one transverse of the door edge and over the metal spot $j$ which comprises simply a metal ring with a screw in the opening of the ring. This spot engages with the wing when the wing is turned to the locked position, and prevents the latch from rattling as the spot can be advanced more or less against the door post by the screw.

Figure 1:
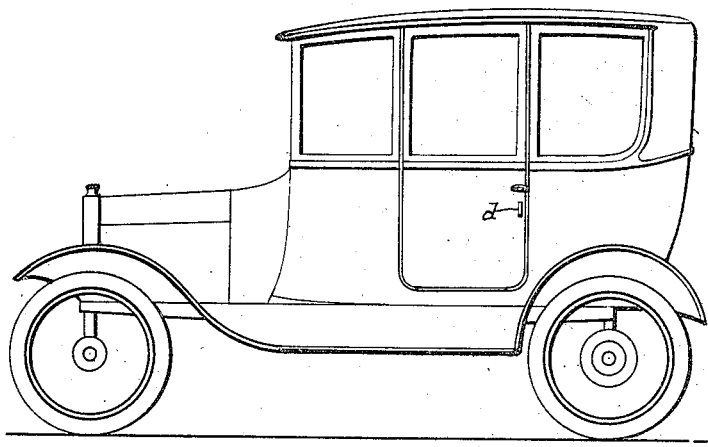
Figure 1 is a side elevation of a closed car showing how the hardware is applied.
Figure 2:
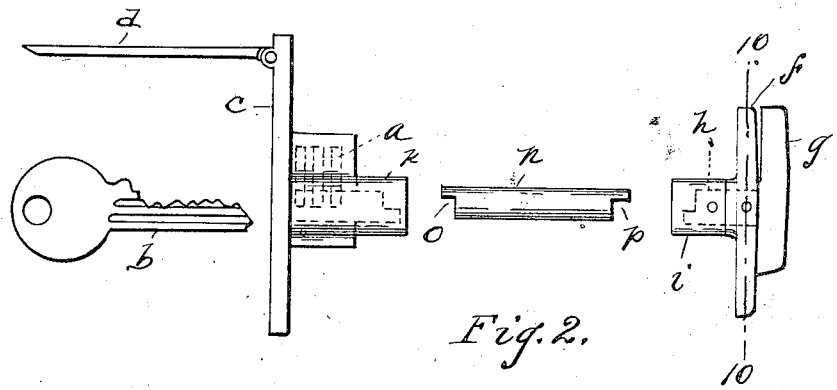
Fig. 2 is an elevational view showing how the lock hardware is assembled.
Figures 3, 4, 5:
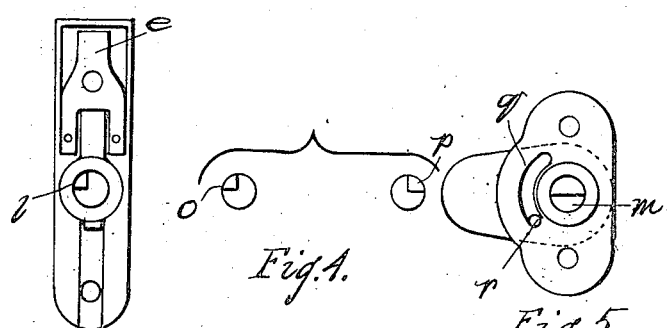
Fig. 3 is a rear elevation of the lock escutcheon and housing.
Fig. 4 shows the opposite ends of the lost motion connector between the lock and the fastening device.
Fig. 5 is a rear view of the fastening device.

Mention has already been made of the fact that a cylinder or pin tumbler lock will only allow the escape of the key when it is turned through a complete revolution. The wing, of course, turns through only a quarter of a revolution from one position to the other. Consequently provision has to be made for three quarters of a turn lost motion. Also provision has to be made for connecting up the end of the lock barrel with the end of the pintle of the fastening device. This lost motion inheres in the relations of the connector to the ends of the barrel of the cylinder or pin tumbler lock and the pintle of the fastening device. The barrel enlarges at its inner end forming the head $k$ which has a circular socket at its inner end provided with a quarter segment $l$ (Fig. 3). The sleeve $i$ forms an enlargement of the pintle $h$ and it also is provided with a circular socket in its inner end and this socket is provided with a half segment $r$ (Fig. 5). Fig. 4 shows both ends of the connecting pin $n$. It will be seen that each end comprises a segmental projection one-quarter of a circle, designated $o$ and $p$.

It will be seen that the diameter of the sleeve $i$ is equal to the diameter of the enlarged end of the barrel $k$. The pin $n$ is smaller than either in diameter. Consequently none of the usual cutting to apply a lock to a door and a door post is required. All that is required is the boring of a hole slightly greater in diameter than the diameter of the enlarged end $k$ of the barrel and the sleeve $i$. At the front of this hole a slight offset or enlargement is required for the casing of the cylinder or pin tumbler lock. No other cutting of either the door or door post is required. This makes the lock both cheap and serves to avoid cutting the door post in jobs where the door post is not designed to be cut.

It will be seen from looking at Fig. 5 that the fastening device escutcheon $f$ is provided with a segmental slot $q$ in which the pin $r$ attached to the underside of the wing $g$ travels so as to limit the turning movement of the wing to one-quarter of a turn. In Figs. 10 and 11 there is illustrated the sections of the fastening device pintles which show how the pintles are recessed to accommodate the spring and ball detents $s$. The detent operating in the slots $t$, $t$ of the escutcheon $f$ (Fig. 10) or wing (Fig. 11) tends to retain the wing in either of the extreme positions of the quarter turn so as to keep it from accidentally being displaced.

The lock may be assembled by securing the two escutcheons to the front and rear of the door with the connector intervening between the barrel and the pintle. The connector pin also makes the device adjustable to doors of different thicknesses. The operation of the device is as follows: The key being inserted in the key slot, the spring tumblers all divide at the exterior of the barrel, consequently the barrel may be turned but inasmuch as the quarter segment $l$ engages with the quarter segment $o$, there is a lost motion of a half a turn between the barrel end and the connector. Inasmuch as the other end of the connector $n$ has a quarter segment $p$ engaging with a half segment $m$, the lost motion here is only one-quarter of a turn, making the total possible lost motion at the two ends of the connector three-quarters of a turn. Consequently the wing does not turn either on the locking or the unlocking rotation of the key until the final quarter of the key, the first three-quarters of the turn being lost motion. The wing $g$ turns onto the spot where it stays by reason of the spring detent until the key is turned to unlock the device.

The modification shown in Figs. 5, 7, 9 and 11 may be provided with a thumb hold $x$ and used on the inside of the other door.

What I claim is:

1. In hardware for the purpose specified, the combination of a pin tumbler lock provided with a barrel end having a quarter of a segment on its end, a wing turning through a quarter of a turn from one position to the other and having a pintle provided with an end having a half segment, and a connecting pin between the ends of the pintle and the barrel having at each end a quarter of a segment which engages with the segments on the said pintle and barrel ends.

2. In hardware for the purpose specified, the combination of a pin tumbler lock provided with an enlargement at one end forming a circular socket having a quarter segment in it, a fastening device including a wing which turns through a quarter of a turn and which is provided with a pintle having a sleeve about its inner end, the said pintle and sleeve forming a circular socket with a half segment in the same, and a connecting pin for the barrel and the pintle fitting into the circular sockets in the pintle and barrel ends and having at each end a quarter segment engaging the segments on the barrel and pintle ends.

3. In hardware for the purpose specified, the combination of a lock, an escutcheon for holding the same, a second escutcheon, a fastening device supported in said second escutcheon in the form of a wing that turns through part of a turn from locked to unlocked position, and a removable pin separable from both escutcheons and having such a connection with the lock barrel and the fastening device as to provide lost motion between the same to allow the release of the key.

4. In hardware for the purpose specified, the combination of a lock, an escutcheon for holding the same, a second escutcheon, a fastening device supported in said second escutcheon in the form of a wing that turns through a quarter of a turn from locked to unlocked position, and a removable connecting member separable from both escutcheons solely by removing one of the escutcheons, the said connecting member having such a relation with the lock barrel and the fastening device so as to provide lost motion between the same to allow the release of the key.

5. In hardware for the purpose specified, the combination of a lock, an escutcheon for holding the same, a second escutcheon for location on the opposite side of the door provided with a segmental slot, and fastening devices supported in said second escutcheon in the form of a wing that is provided with a pin engaging in said slot to limit the turning movement of the wing to part of a turn, and a connecting member separable from at least one of the escutcheons when the same is removed from its position of service, said connecting member having such a relation with the lock barrel and the fastening device as to provide lost motion between the same to allow the release of the key.

6. In hardware for the purpose specified, the combination of a pin tumbler lock, an escutcheon for holding the same on one side of the door, a second escutcheon for holding the same on the opposite side of the door, a fastening device supported in said second escutcheon in the form of a wing provided with a member that engages with a portion of the escutcheon to limit the turning movement to a part of a turn, a connecting member for connection between the lock barrel and the fastening device when the two escutcheons are in place and having a lost motion relation to the lock barrel and the fastening device to allow removal of the key, and a restraining detent at each end of the part turn through which the fastening device can turn to avoid accidental movement of the fastening device.

In witness whereof I have hereunto set my hand on the 30th day of November, 1917.

JOHN T. ALLMAND.